United States Patent [19]
Chandrasekaran et al.

[11] Patent Number: 5,462,364
[45] Date of Patent: Oct. 31, 1995

[54] VARIABLE SPEED FLUID BEARING AND METHOD OF USE

[75] Inventors: Kugalur S. Chandrasekaran, Rockford, Ill.; Daniel M. Mills, Riverview; Richard Ogletree, Southfield, both of Mich.

[73] Assignee: Ford Motor Company, Dearborn, Mich.

[21] Appl. No.: 42,201

[22] Filed: Apr. 2, 1993

[51] Int. Cl.⁶ ............................................ F16C 32/06
[52] U.S. Cl. ............................................... 384/111
[58] Field of Search .................... 384/118, 288, 384/121, 111, 107

[56] References Cited

U.S. PATENT DOCUMENTS

| | | |
|---|---|---|
| 4,490,054 | 12/1984 | Kimmelaar . |
| 4,693,642 | 9/1987 | Mair et al. . |
| 4,834,559 | 5/1989 | Kalvoda ........................... 384/118 |
| 4,930,910 | 6/1990 | Mori et al. ......................... 384/288 |
| 5,010,794 | 4/1991 | Klager . |
| 5,022,769 | 6/1991 | Jacobs et al. ...................... 384/118 |

FOREIGN PATENT DOCUMENTS 2507265  12/1982  France .

*Primary Examiner*—Lenard A. Footland
*Attorney, Agent, or Firm*—Joseph W. Malleck; Roger L. May

[57] ABSTRACT

A fluid bearing assembly for rotatably supporting a rotary-driven spindle having smooth bearing surfaces. Each bearing has a stationary housing holding an annular bearing race that presents a smooth continuous bearing surface facing a complementary bearing surface of the spindle; together the race and spindle define a continuous, thin, uniform crevice space. The smooth race bearing surface is interrupted by a plurality of circumferentially spaced pressure generating zones, each capable of dynamically compressing a fluid body contained in the zone into the crevice in either direction of rotation of the spindle at higher speeds. Pressurized fluid is supplied to flow through each zone and out of the crevice while exerting a predetermined hydrostatic force against the spindle at lower rotational speeds.

4 Claims, 5 Drawing Sheets

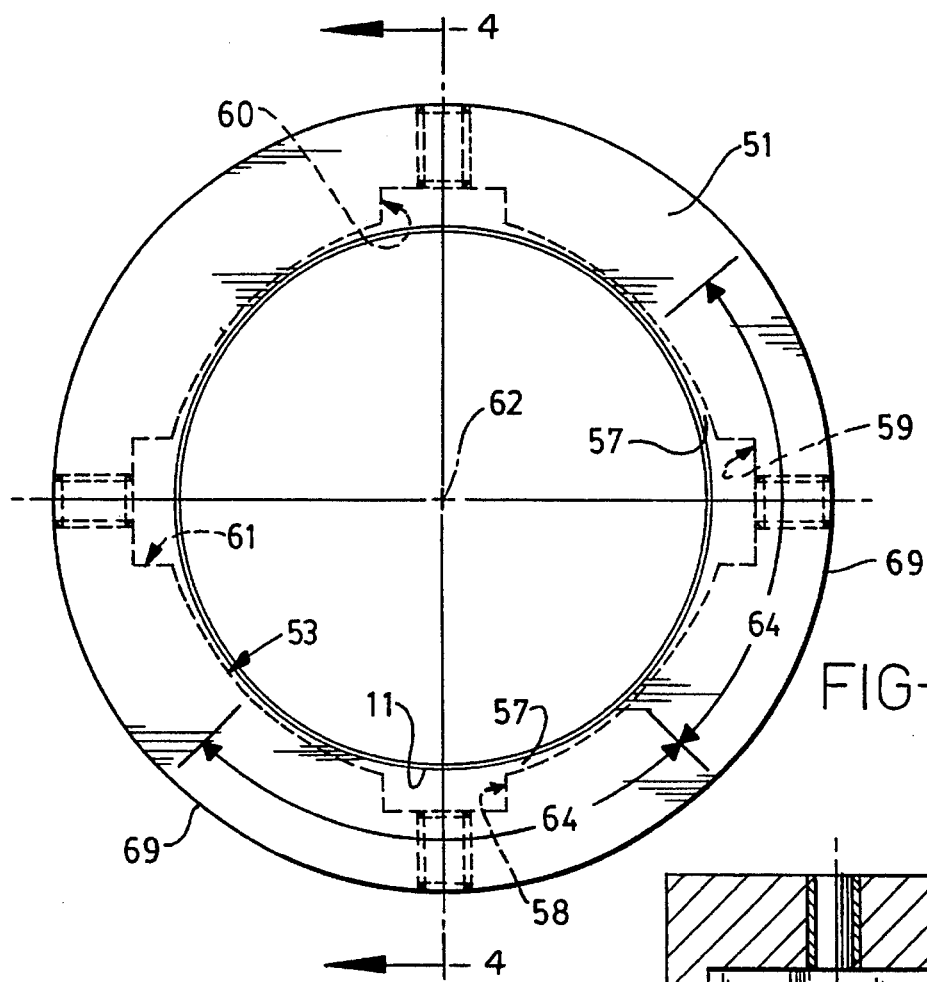
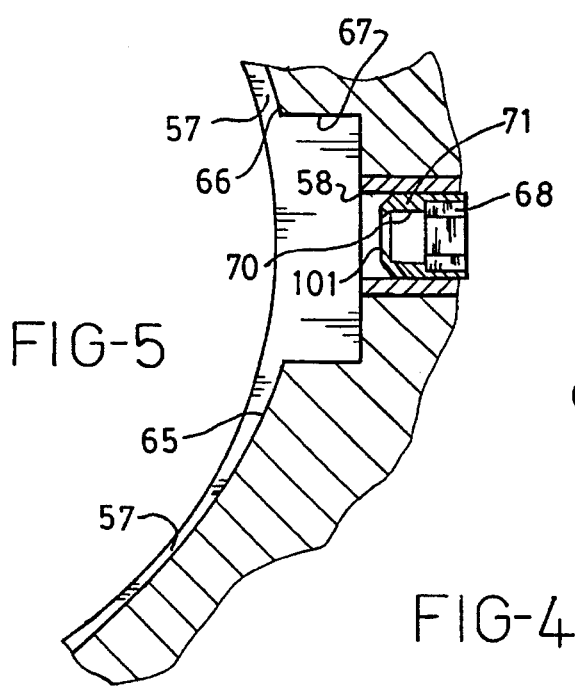
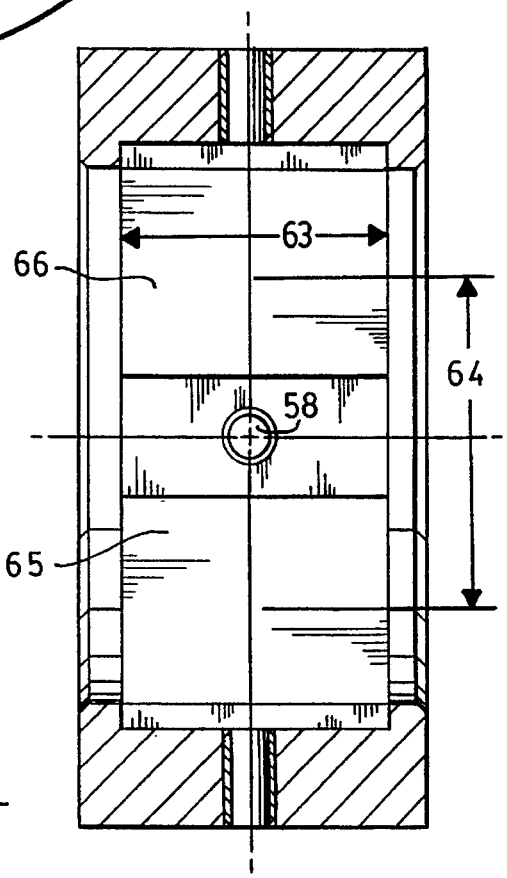

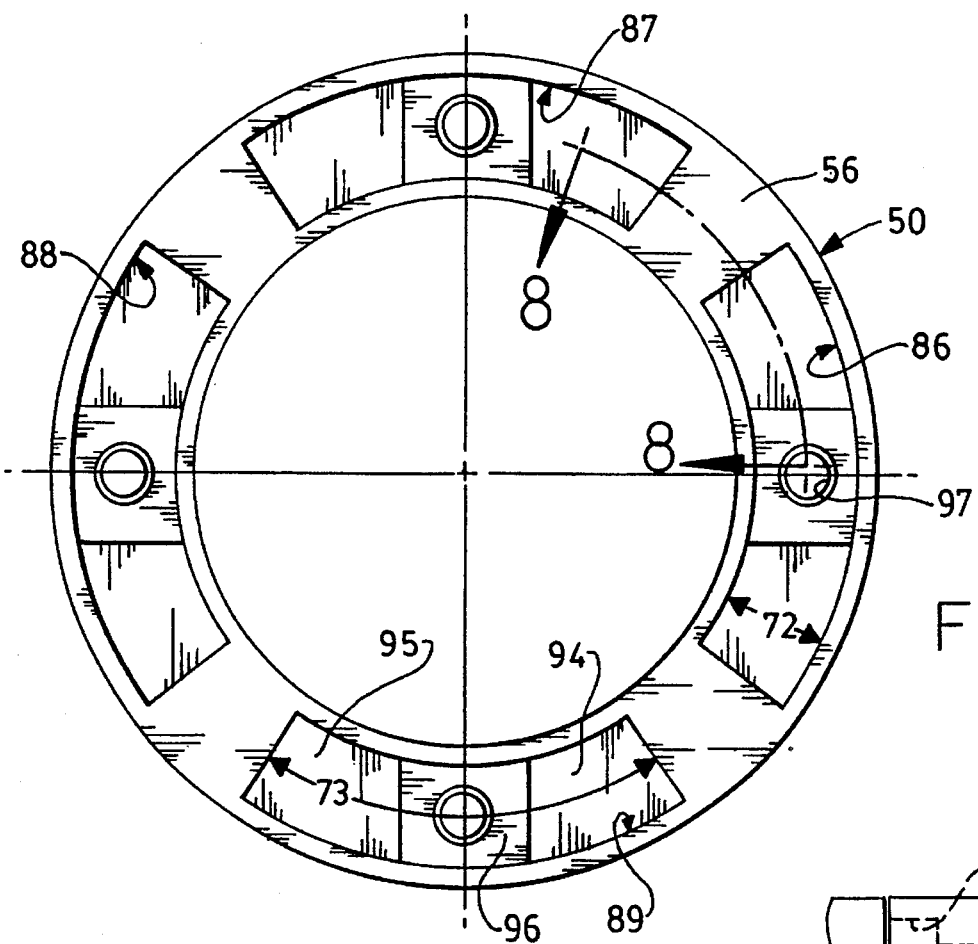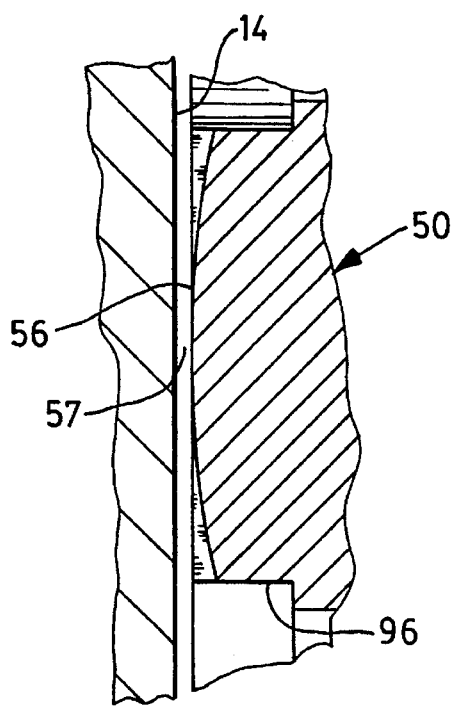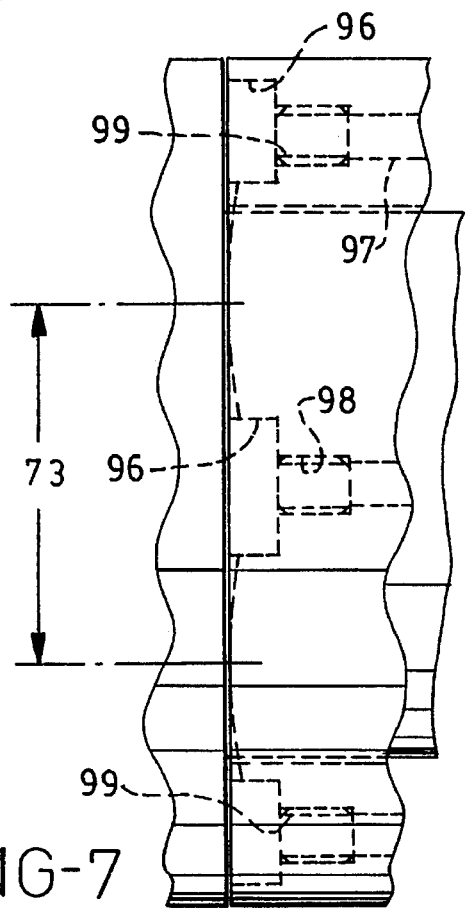

VARIABLE SPEED FLUID BEARING AND METHOD OF USE

BACKGROUND OF THE INVENTION

1. Technical Field

This invention relates to the making and use of hydrodynamic or hydrostatic fluid bearings for supporting rotary machining spindles located in such bearings and, more particularly, to the art of hybridizing such hydrodynamic and hydrostatic bearings to permit such bearings to operate effectively at slow speeds as well as variable high speeds up to 40,000 rpm.

2. Discussion of the Prior Art

Hydrostatic liquid or gas bearings alone are useful in providing a fluid film that supports a rotating spindle at relatively low speeds for machining operations. Such bearings may have thick hydrostatic sills extending extensively along a substantial length of the shaft to be supported (see U.S. Pat. No. 5,010,794), or the bearings may have a concentrated, thin, radial port acting as the hydrostatic chamber. Such hydrostatic bearings are limited because they cannot be used under heavy industrial loading at varying rotational spindle speeds where the range between the minimum and maximum intended use speeds for the spindle is greater than 10,000 rpm. Any combination of pressure and viscosity designed into such bearings cannot accommodate both extreme ends of the spindle speed range and thus causes excessive heat to be generated at the extreme high end or failure to form a good bearing film at the other end.

Hydrodynamic fluid bearings alone have found use in supporting machining spindles. Ramped pressure generating zones have been defined on the outer surface of spindles, such ramps extending along a sector of the circumference of the spindle, such as 60°, accompanied by a varying profile shape that is extremely difficult to machine (see U.S. Pat. No. 4,693,642). Hydrodynamic bearings inherently are unstable at low spindle speeds due to insufficient dynamic pressure if the spindle loading is heavy; at high spindle speeds, i.e., 20,000–40,000 rpm, the bearing fluid may become thin due to heat and affect bearing performance.

U.S. Pat. No. 4,490,054 has attempted to aggregate hydrostatic and hydrodynamic concepts, each bearing being independent from the other, but aggregation fails to achieve benefits of an integrated hybrid system. Shoes, separated by low pressure chambers and conforming identically to the curvature of the spindle, tilt to create wedging pressure generating zones in one direction; a relieved area in the middle of the shoe allows hydrostatic fluid pressure to flow out of the shoes independently of the hydrodynamic effect. As a result, hydrodynamic pressure is limited.

What is needed is an integrated fluid bearing system that can attain at least 1000 psi hydrodynamically at higher speeds (i.e., 10,000–40,000 rpm) while retaining controlled hydrostatic pressures at lower speeds, thereby providing enhanced stiffness for a spindle subject to large side or thrust loads even at a variety of speeds.

SUMMARY OF THE INVENTION

This invention achieves the above object by (i) use of a thin, continuous, uniform space for fluid that extends around and between the spindle and race to form a circumferential squeeze crevice, and (ii) use of unique zones and ports in the race that influence the fluid in the crevice. The pressure generating zones face the spindle at equi-circumferential locations; each zone has (i) a width, transverse to the direction of spindle rotation, that is generally equal to or less than the length of such zone taken along the direction of rotation, and (ii) has, advantageously, two pockets facing the spindle surface, each being capable of compressing a fluid blanket segment in a direction of rotation opposite from the other. Equi-circumferentially located hydrostatic pressure supply ports extend through each race at a central location of each zone to fill the crevice with a controlled hydrostatic pressure. Design and arrangement of the hydrodynamic pockets as well as automatic variation of either the port size or pump supply pressure changes the hydrostatic pressure at different spindle speed regimes in conformity with the selected viscosity.

A method of use aspect of this invention comprises: (a) providing and assembling at least two bearing assemblies about a rotary-driven spindle for supporting a cutting tool at one end of the spindle, each bearing assembly having an annular race with a smooth continuous surface facing a complementary smooth surface of the spindle to define an annularly continuous, thin, uniform crevice space therebetween, the race surface being interrupted by a plurality of circumferentially spaced, pressure generating zones capable of bi-directional pressure generation; (b) driving the spindle at rotary speeds varying between zero and 40,000 rpm; and (c) supplying pressurized fluid to and through the crevice space at a selected viscosity and pressure level correlated with the speed of the spindle, the pressure supply being regulated to a first hydrostatic level when the spindle is driven at rotary speeds up to 2000 rpm, and at one or more incrementally lower hydrostatic levels when the spindle is driven at rotary speeds in excess of 2000 rpm.

BRIEF DESCRIPTION OF THE DRAWINGS

FIG. 1A is a diagrammatic view of the hybridized bearing of this invention;

FIG. 3 is an enlarged axial view of a cylindrical race forming part of one fluid bearing of FIG. 1;

FIG. 4 is a central sectional elevational view of the cylindrical race of FIG. 3 taken along line 4—4 thereof;

FIG. 5 is a still further enlarged fragmentary view of FIG. 3;

FIG. 6 is an enlarged axial view of a flat ring race forming part of another fluid bearing of the assembly of FIG. 1;

FIG. 7 is an end view of FIG. 6;

FIG. 8 is a still further enlarged sectional view of the race in FIG. 6 taken along line 8—8 thereof;

DETAILED DESCRIPTION AND BEST MODE

Figure 1:
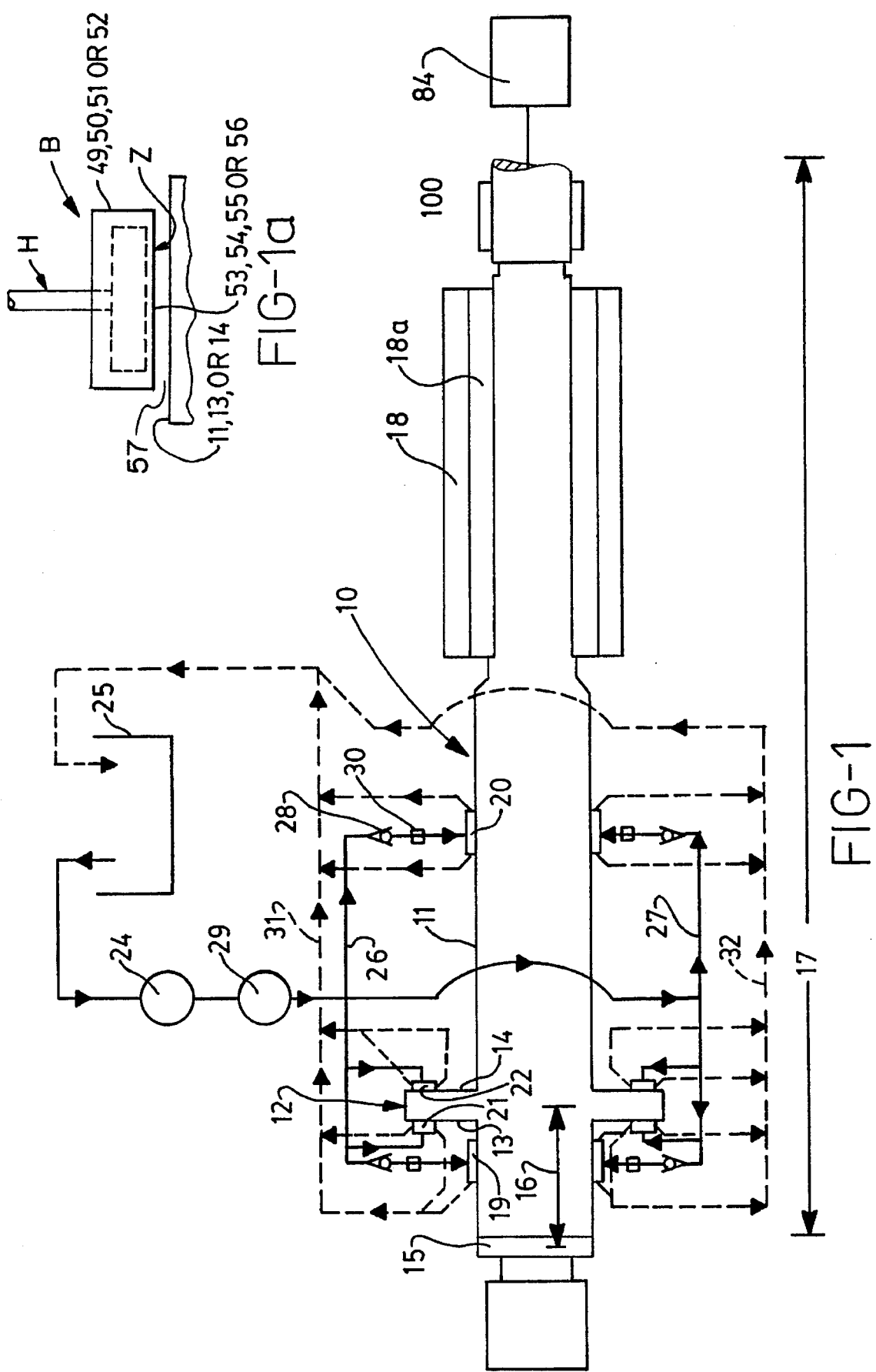
FIG. 1 is a schematic elevational view and hydraulic control diagram of a spindle assembly embodying the principles of this invention.

The advent of ultra high-speed, flexible machining has placed severe demands on rotary bearings to operate at speeds varying up to as high as 40,000 rpm, facilitate automatic tool changing at extremely rapid cycle times, and provide increased wear life. The hybridized hydrodynamic/hydrostatic bearing B of this invention meets such expectations.

As shown schematically in FIG. 1a, such bearing B broadly comprises an annular race (49, 50, 51, or 52) that is secured against rotation with the spindle 9 and presents a bearing race surface (53, 54, 55, or 56) facing a spindle bearing surface (11, 13, or 14) to define a thin crevice 57 (about 0.0008 inches); each such race surface is interrupted by a plurality of circumferentially spaced pressure generating zones Z, each capable of compressing a fluid body contained within the zone into the crevice in either direction of rotation of the spindle about its axis at higher rotational speeds. Fluid supply means H feeds each of the zones Z to additionally exert a hydrostatic force throughout the crevice at lower rotational speeds of the spindle.

Figure 2:
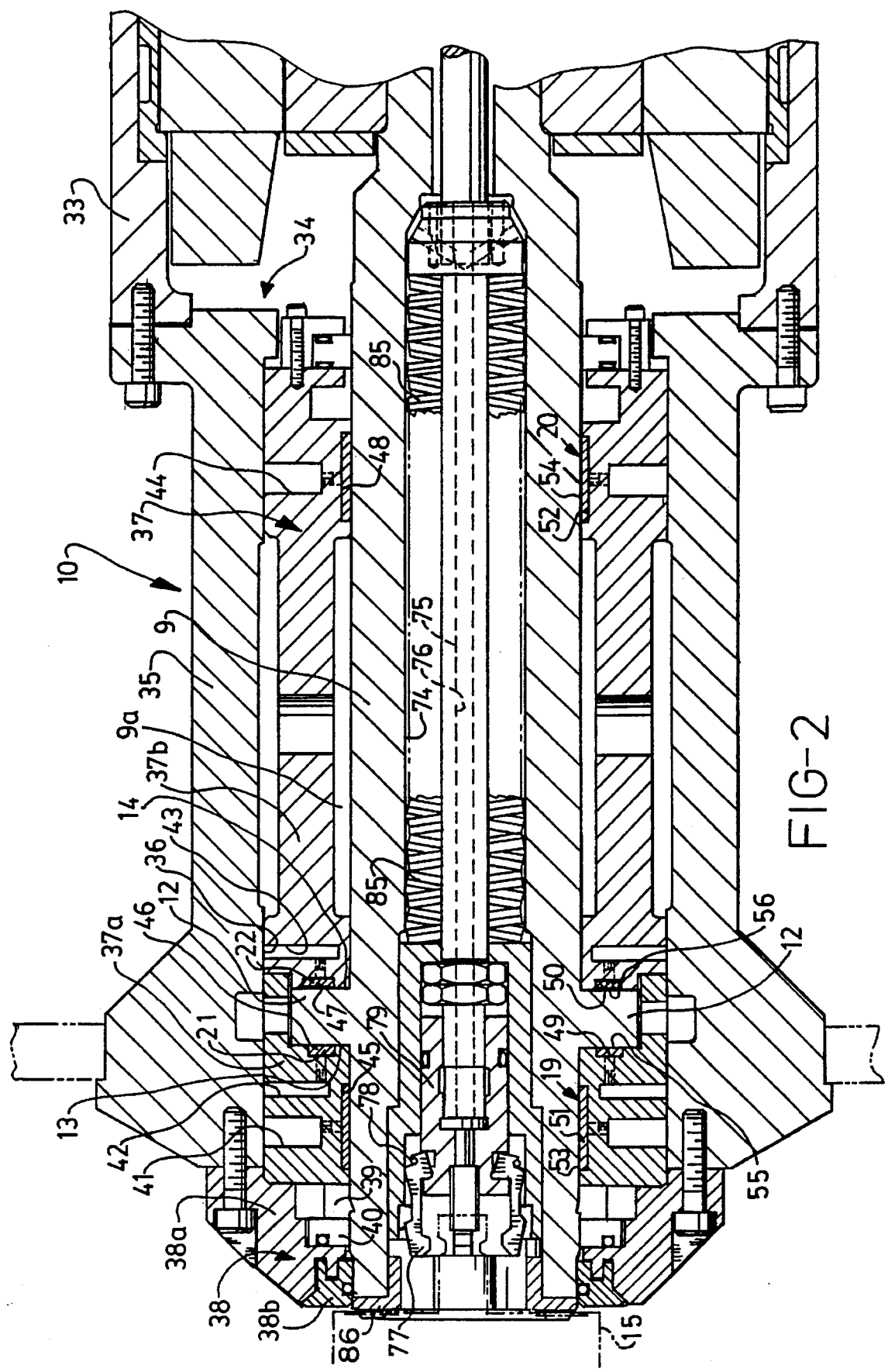
FIG. 2 is an enlarged detailed elevational view of the spindle assembly shown in FIG. 1.
Figure 9:
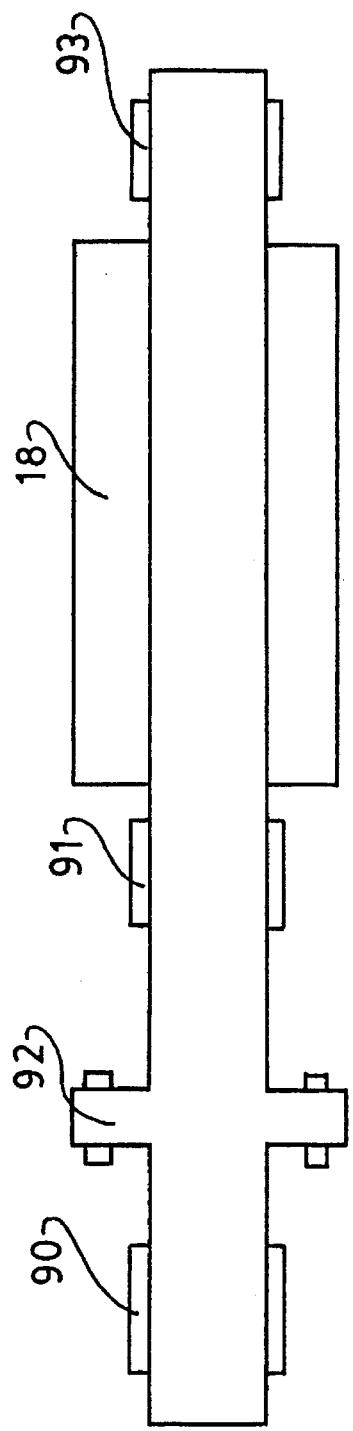
FIG. 9 is a schematic view of an alternative spindle assembly embodying the principles of this invention.

Turning, in detail, to FIGS. 1 and 2, the spindle assembly 10 has a spindle (quill shaft) 9 provided with a smooth outer cylindrical surface 11 and has an integral radial flange 12 carrying oppositely facing smooth flat surfaces 13, 14. Flange 12 is located from the cutting tool 15 a distance 16 (typically less than 12 inches) to promote enhanced centering and axial control of the cutting tool. The spindle has a length 17 sufficient to accept therearound a rotary-driven motor 18, two radially supporting fluid bearings 19, 20, and a pair of thrust fluid bearings 21, 22 on opposite sides of the flange. The spindle may be shortened if the motor is placed closer to the flange, as shown in FIG. 9, but would necessitate a third radial bearing outside the other end of the motor. The extended spindle, as shown in FIGS. 1—2, allows the motor 18 to be spaced at a greater distance from the tool to further separate the heat generated by the motor from the cutting tool area. The spindle is swaged to the rotor 18a of motor 18 to provide a permanent driving connection.

The two thrust bearings envelop the outer region of the flange 12, one (21) facing surface 13 on the flange and the other (22) facing the surface 14. The two radial supporting bearings are located with one (19) adjacent the tool 15 and another (20) located on the opposite side of the flange 12 adjacent to motor 18. The remote end of the spindle 9 is supported by a mechanical bearing 100; a piston and cylinder device 84 is stationed at this end to move a rod axially that is contained in the spindle for actuating a tool clamp. The spindle 9 drives the tool 81 through a tool adapter 86.

Fluid pressure is delivered to each of the fluid bearings B by a hydraulic system H, as shown in FIG. 1. A variable pump 24 draws fluid from a sump 25 and delivers pressurized fluid through split delivery lines 26, 27 to at least opposite sides of each fluid bearing (i.e., to the upper and lower sides of the radial fluid bearings and to the top and bottom of the thrust fluid bearings). Preferably, fluid pressure is delivered to each quadrant of the cylindrical races 51, 52 for the radial bearings, and to each 90° sector of the ring races 49, 50 for the thrust bearings. Fluid enters a central axial location for the radial bearing races 51, 52 and a central radial location for thrust bearing races 49, 50; the fluid spreads throughout the crevice 57, defined by the races and spindle 9 or between the races and surfaces 13, 14, and proceeds to the lateral edges of such crevice where it is returned to sump by split return lines 31, 32 that pick up the emigrating fluid flow. The edges are at the opposite axial sides of the cylinder for the radial fluid bearings and are at radially opposite peripheries of the ring for the thrust fluid bearings. A variable pressure regulator 29 controls the pressure in accordance with the method of use as described later. Fluid flow to each fluid bearing is controlled by a one-way ball check valve 28 (only certain ones are shown in FIG. 1). An orifice 30 is used at each supply to a bearing to set a differential pressure between the supply pressure and the actual working pressure in the fluid bearing itself; this allows the pressure in the bearing to be at a lower pressure than supply so pressure fluctuations, resulting from side loads or thrust loads, will be overcome and allow the bearings to maintain their centralized alignment and stability.

The housing 34 for the spindle is assembly 10, attached to the fixed motor housing 33, and consists of an outer cylindrical housing portion 35 (having internal cylindrical surface 36) and an inner cylindrical housing portion 37 snugly slidable within the outer housing. The motor housing is supported on a stationary device or preferably on a movable ram forming part of a positioning device for a high-speed machining apparatus.

The inner housing portion 37 is comprised of parts 37b extending along a considerable portion of the length of the spindle, and a portion 37a which is stepped to provide assembly of the inner bearing about the flanged portion of the spindle. The inner housing portion 37, after insertion within the outer housing, is locked into position by an annular member 39; the outer and inner housing portions are closed by a plate 38 coupled to the outer housing portion; portions 38a and 38b of the closure plate are dovetailed to provide adequate sealing about the forward portion of the spindle. Annular element 40 cooperates with the closure element in sealing fluid therein.

The inner housing portion 37 has a plurality of radially directed supply channels (see axially spaced channels 41, 42, 43, and 44 at one quadrant of the inner housing portion). The preferred embodiment here employs four of such supply channels for each of the fluid bearings directed at about 90° circumferential intervals, although three equi-spaced supply channels or greater than four can be made to operate the fluid bearings.

Portion 37a of the inner housing defines bearing cavities 45 and 46, and portion 37b of the inner housing defines cavities 47, 48. Cylindrical cavities 45 and 48 receive the respective radial bearing races 51, 52. The ring-like cavities 46, 47 receive ring-like races 49, 50. Each race has a continuous smooth facing or bearing surface (53, 54 for the two radial bearings and 55, 56 for the two thrust bearings). Such bearing surfaces are machined to a micro-fine finish. The races are comprised of a material such as bronze, having a high hardness. The races (51, 52, 49, or 50) fit snugly within their respective housing cavities (45, 48, 46, or 47), with the smooth inwardly facing surfaces (respectively, 53, 54, 55, or 56) of the races in an opposed facing manner with the smooth complementary surface 11 of the spindle for certain bearings, or surface 13, 14 of the flange for other bearings, thereby defining a continuous, thin, circumferential squeeze crevice 57. Crevice 57 has a thickness dimension in the range of 0.002–0.0008 inches.

Each of the races has a plurality of unique pressure generating zones in its inwardly facing surface (i.e., 53, 54, 55, 56). For illustration and as shown in FIGS. 3–5, race 51 has a cylindrical, inwardly facing circumferential surface 53 which has four pressure generating zones 58, 59, 60, 61 equally spaced about axis 62. Each zone for such radial bearing has a width 63 (transverse to the direction of spindle rotation) which is generally at least two-thirds or greater than the length 64 of such zone (taken along the direction of rotation of the spindle). Each zone has two pockets 65, 66, one pocket 65 compressing a fluid blanket in one direction of rotation of the spindle, and pocket 66 compressing a fluid blanket in the opposite direction of rotation. The pockets are sleeve-like and contoured to provide a gradually decreasing crevice to the location where the adjacent zone meets the surface 53 on the next zone. For example, the pocket 65 tapers from a thickness of about 0.002 inches to the crevice thickness of about 0.0008 inches. Each zone has a central recessed and axially extending sill 67, with the pockets 65, 66 extending in opposite circumferential directions from the sill. A supply port 68 extends from the outer surface 69 of the race into such sill; the supply port has a sharp-edged orifice 70 at one end of a control insert 71 to reduce pressure of the fluid carried into the sill. The orifice can be stationed immediately adjacent each sill and receives pressurized supply fluid from one of the channels in the inner housing portion. Axially extending supply channels, such as the split paths 26 and 27, may be machined in the outer housing portion to communicate with the radially extending supply channels as previously described.

The two thrust bearing races 49, 50 operate respectively facing the sides 13, 14 of the flange 12, which is an extension of spindle 9. For purposes of this invention, when reference is made to pressure generating zones or pockets that face the spindle surface, such surface comprehends both the cylindrical spindle surface 11 as well as the flat surfaces 13, 14 on flange 12 extending from surface 11. Each of the thrust races have a plurality of unique pressure generating zones 86, 87, 88, 89. For illustration, FIGS. 6–8 show race 50 that has a ring-like surface 56 facing flange surface 14. Surface 56 has four pressure generating zones (86–89) arcuately defined therein. Each zone has a radial width 72 which is at least about one-third or greater than the arcuate length 73 of such zone. Each zone has two pockets 94, 95, one pocket 94 for compressing a fluid blanket into the crevice in one direction and the other pocket 95 for compressing a fluid blanket into the crevice when the spindle is rotating in the opposite direction. The arcuate pockets are contoured to provide a gradually decreasing thickness starting from the central sill 96 in each zone and ending at the location where it meets surface 56 of the race. This creates a canted lobe profile. The sill is a radially extending receptacle much deeper than the pressure generating pockets and provides a fluid blanket that can be squeezed by the pockets as the spindle rotates to drag the fluid further into the pocket. A supply port 97 extends from the outer surface of the race to the sill and contains an insert 98 that has the sharp-edged orifice 99, similar to that for the radial bearings.

The bearing assembly can be varied such as shown in FIG. 9. Radial support hybrid bearings 90 and 91 are stationed close to the spindle flange 92 while a third radial support hybrid bearing 93 is stationed on the outboard side of the motor 18. This arrangement allows closer positioning of the motor to the cutting tool.

In operation, pressurized fluid is delivered through the outer housing 35 to the radially directed channels (i.e., 41, 42, 43, 44) to the orifices 70 and 99 and thence to the ports 58, 97 of the bearings. The delivered pressure to the orifices is in the range of 400–800 psi (static pressure). The insert plug 71 or 98 has a construction designed to reduce the pressure that is eventually delivered to the crevice space 57, each plug is constructed as a cylindrical member 69 having a central bore 70 which is conically shaped at the orifice side to define an annular lip 101 with a precision internal opening representing the throttle size for pressure reduction. A specific throttle ratio can be provided between supply pressure and hydrodynamic pressure that accommodates higher spindle speeds. A hexagonal opening 68 is defined at the other end for receiving a suitable fastening device used to secure the orifice element in place.

The eventual restricted pressure within the crevice cavity must be in the range of 200–400 psi static pressure. Such pressure will provide a high stiffness for the rotating spindle at rotational speeds from 0–2000. To achieve such stiffness characteristic, the fluid selected must have a viscosity in the range of ISO VG 6, and the crevice should be ultrathin, i.e., in the dimensional range of 0.0002–0.0012 inches. At rotational speeds progressively increasing above 2000 rpm, the pressure generating zones will take over and squeeze such fluid or oil into the narrower crevice spaced between the pockets. As the spindle rotational speeds increase in excess of 2000 rpm to as much as 40,000 rpm, the pressure in the crevices will approach and exceed 1000 psi. The fluid will heat up excessively within the crevice space at speeds exceeding 15,000 or 20,000 rpm, if such crevice is designed to optimize the hydrodynamic effects at speeds below 20,000 rpm. Accordingly, controllable variation of the flow orifices or use of a controllable variable pressure supply pump will enable the fluid to be pressurized and operate optimally in widely different speed regimes. For example, static pressure may be delivered in the range of 200–400 psi for a crevice volume that is designed for extremely high rotary speeds of 20,000–40,000 rpm; when the rotary speeds are reduced to the range of 5,000–20,000 rpm, the supply pressure can be progressively increased to the range of 800 psi by either variation of the pump pressure or variation of the orifice size. The viscosity of the fluid medium can be selected to be relatively low or thin in nature so that it operates effectively with lower pressures at high spindle speeds for effective hydrodynamic effects, and then with an increase in pressure, operates effectively at the lower rpm speeds for effective hydrostatic effects.

Figure 10:
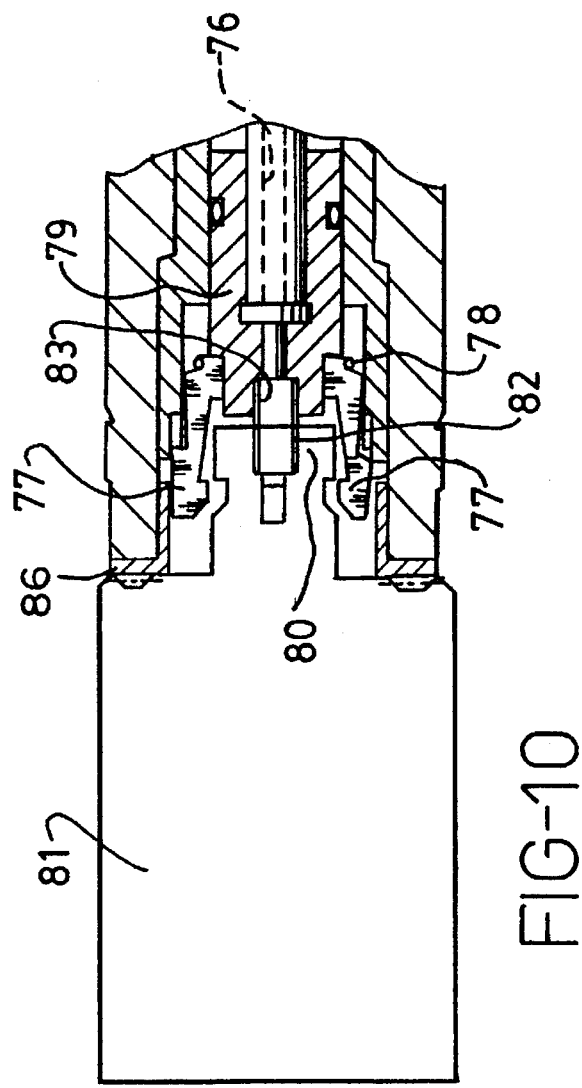
FIG. 10 is a slightly enlarged view of one end of the view in FIG. 3.

The spindle assembly may be of the type that has a hollow channel 74 in the quill shaft through which extends a rod 75 as part of a tool changing mechanism (see FIGS. 2 and 10). The rod itself may have a central cooling channel 76 which carries cooling fluid which also helps to remove chips created by the cutting tool at the end of the rod. To effect tool changing, the rod may carry jaws 77 pivotal on a ring 78 attached to the quill shaft; the rod 75 may carry at its end a slide 79 which contacts the jaws 77 when urged in a forward movement to pivot the jaws about ring 78. Upon spreading of the jaws, a complementary knob 80 on each of the tool mounts 81 may be released or gripped. The tool mount 81 may have a nipple 82 for insertion into an opening 83 that communicates with the central coolant channel 76. The rod 75 is actuated to a tool release position by a piston cylinder device 84 and is retracted to a tool clamping position by belleville type springs 85.

We claim:

1. A method of using hybridized, hydrodynamic/hydrostatic fluid bearings for supporting a rotary-driven spindle carrying annular bearing surfaces, comprising:

(a) providing and assembling at least two bearings about said spindle carrying a cutting tool at one end, each bearing comprising a bearing race having an annular surface facing a complementary annular surface on said spindle to define a continuous annular crevice space therebetween, each of said races having its race surface interrupted by a plurality of circumferentially spaced pressure generating zones each capable of compressing a fluid body contained within said zone into said crevice in either direction of rotation of said spindle, the zones of one of said races having their width extending axially while the zones of the other races having their width extending circumferentially, each zone of said races being comprised of a pocket having a recessed sill bisecting said pocket and a pair of pressure generating surfaces extending in opposite directions from said sill, each pressure generating surface being the mirror image of the other;

(b) driving said spindle at rotary speeds that vary between zero and 40,000 rpm; and (c) supplying pressurized fluid to all of said sills for flow through said crevices with a preselected viscosity and a preselected pressure level correlated with the speed of said spindle, said pressurized supply being regulated to a first hydrostatic level when said spindle is driven at rotary speeds of up to 2000 rpm, and at hydrostatic level lower than said first hydrostatic level when said spindle is driven at rotary speeds in excess of 2000 rpm.

2. The method as in claim 1, in which said bearings together are effective to provide both radial support as well as axial thrust bearing support.

3. The method as in claim 2, in which step (a) comprises assembling a pair of axial thrust bearings opposed to each other, and assembling a pair of radial support bearings, said radial support bearings being located adjacent to the tool on one side of said axial thrust bearings, and another radial support bearing being located on the opposite side of said axial thrust bearings at a distance from said axial thrust bearings which is generally equal to the distance the tool is from the axial thrust bearings.

4. The method as in claim 1, in which said means for supplying fluid has an orifice control between the supply pressure and the crevice volume to reduce the pressure to a predetermined amount in said space.

* * * * *